United States Patent
Ramdatt

(10) Patent No.: US 8,378,008 B2
(45) Date of Patent: Feb. 19, 2013

(54) SURFACE-MODIFIED NON-HALOGENATED MINERAL FILLERS

(75) Inventor: Philbert E. Ramdatt, New York, NY (US)

(73) Assignee: Momentive Performance Materials Inc., Albany, NY (US)

(*) Notice: Subject to any disclaimer, the term of this patent is extended or adjusted under 35 U.S.C. 154(b) by 0 days.

(21) Appl. No.: 12/829,950

(22) Filed: Jul. 2, 2010

(65) Prior Publication Data

US 2011/0009545 A1 Jan. 13, 2011

Related U.S. Application Data

(63) Continuation of application No. 11/451,874, filed on Jun. 13, 2006, now abandoned.

(51) Int. Cl.
- *C08K 9/06* (2006.01)
- *C09C 1/02* (2006.01)
- *B32B 15/02* (2006.01)
- *B32B 9/04* (2006.01)

(52) U.S. Cl. ........ 523/212; 106/461; 523/213; 523/205; 428/403; 428/404; 428/405; 428/447; 428/500

(58) Field of Classification Search .............. 428/447, 428/500, 484, 403, 404, 405, 406, 407; 524/441, 524/506, 451, 494, 606, 430, 600, 437; 525/100; 523/200, 212, 213, 205; 424/65, 267, 269; 106/461

See application file for complete search history.

(56) References Cited

U.S. PATENT DOCUMENTS

| | | | | |
|---|---|---|---|---|
| 4,522,958 | A | * | 6/1985 | Das et al. .................. 523/212 |
| 4,711,673 | A | | 12/1987 | Musselman et al. |
| 4,902,106 | A | | 2/1990 | Dijon et al. |
| 5,182,173 | A | | 1/1993 | Swei |
| 5,571,851 | A | * | 11/1996 | Freeman et al. ............. 523/212 |
| 5,885,341 | A | | 3/1999 | Standke et al. |
| 5,902,635 | A | * | 5/1999 | Garafalo et al. ............. 427/212 |
| 6,403,228 | B1 | * | 6/2002 | Mack et al. ................. 428/447 |
| 6,455,158 | B1 | * | 9/2002 | Mei et al. .................... 428/403 |
| 6,500,883 | B1 | | 12/2002 | Mack et al. |
| 6,576,160 | B1 | | 6/2003 | Eichler et al. |
| 6,924,334 | B1 | | 8/2005 | Fukatani et al. |
| 2004/0127602 | A1 | | 7/2004 | Schaeling et al. |

FOREIGN PATENT DOCUMENTS

| | | |
|---|---|---|
| WO | 9905688 | 2/1999 |
| WO | 0198403 | 12/2001 |

* cited by examiner

*Primary Examiner* — James J Seidleck
*Assistant Examiner* — S. Camilla Pourbohloul
(74) *Attorney, Agent, or Firm* — Dominick G. Vicari; Joseph S. Ostroff

(57) ABSTRACT

The invention relates to surface-modified non-halogenated mineral filler compositions comprising a particulate mineral filler core comprising hydroxide groups bound to divalent or trivalent metal ions, said particulate mineral filler core having on its surface (i) one or more short-chain organosilano groups each having one to three silicon-bound short-chain hydrocarbon groups having, independently, one to three carbon atoms, and (ii) one or more long-chain organosilano groups having one to three silicon-bound straight-chained or branched, saturated or unsaturated, long-chain hydrocarbon groups containing, independently, eight to twelve carbon atoms, wherein the long-chain organosilano groups are present in an amount of up to about fifty-five mole percent of combined molar amount of long-chain and short-chain organosilano groups.

29 Claims, No Drawings

SURFACE-MODIFIED NON-HALOGENATED MINERAL FILLERS

CROSS REFERENCE TO RELATED APPLICATIONS

This application is a continuation of and claims priority to U.S. application Ser. No. 11/451,874, filed Jun. 13, 2006, which is incorporated by reference herein in its entirety.

BACKGROUND OF THE INVENTION

1. Field of the Invention

The invention relates to surface-modified non-halogenated mineral fillers, useful as flame retardants in olefin-based polymers.

2. Description of the Prior Art

Particulate mineral fillers, such as magnesium hydroxide and aluminum hydroxide, are widely used as non-halogenated flame retardants in a variety of hydrophobic polymers, particularly olefin-based polymers, e.g., polyethylene and polypropylene.

It is known that since these mineral fillers are hydrophilic in nature, there is a poor interaction between the mineral filler and the hydrophobic polymer. This poor interaction causes problems in the mechanical and physical properties of polymers incorporating these mineral fillers. Some of these physical problems are evidenced by reduced tensile stress and modulus, increased elongation (i.e., strain), and increased melt flow properties.

These problems are exacerbated by the fact that the mineral fillers are typically used in high amounts, i.e., exceeding fifty percent by weight of polymer. At such high amounts of incorporation, these mineral fillers dominate the chemical and mechanical properties of the polymer even further.

To mitigate these problems, particulate mineral fillers have often been surface-treated with surface modifiers to make them more compatible with the polymer base. Some of the surface modifiers that have been used include fatty acids, maleic anhydride-modified polymers, organosilanes, and silicones.

For example, Published PCT Application No. WO/9905688 to Eduardo et al., U.S. Pat. No. 6,576,160 to Eichler et al., U.S. Published Application No. 2004/0127602 to Schaeling et al., and U.S. Pat. No. 6,924,334 to Fukatani et al., disclose particulate magnesium hydroxide surface-treated with a variety of surface modifiers, including silanes.

However, there remains a need for particulate mineral fillers, and particularly magnesium hydroxide mineral fillers, which have been modified in such a way that they can be incorporated in polymers in flame-retarding amounts while imparting less or none of the above-described undesirable physical effects. There is also a need for increasing the weight percentages of mineral fillers in such polymers without the usual worsening of physical properties.

In addition, the mineral fillers currently used in the art, whether surface-modified or not, are typically highly hygroscopic, and accordingly, absorb significant amounts of water during storage and processing. The water absorbed in these mineral fillers cause further problems in the physical properties of polymers into which these water-adsorbed mineral fillers are incorporated. Therefore, there is also a particular need for mineral fillers more resistant to the absorption of water.

BRIEF DESCRIPTION OF THE INVENTION

It has been surprisingly found that, by an unexpected synergistic effect between short-chain organosilane surface modifiers containing hydrocarbon groups of from one to three carbon atoms and long-chain organosilane surface modifiers containing hydrocarbon groups of from eight to twelve carbon atoms, within a critical molar ratio of short-chain organosilano groups to long-chain organosilano groups on the surface of the mineral filler, the chemical properties of mineral fillers can be significantly improved as compared to the chemical properties of such mineral fillers surface-modified by only'one of either a short-chain organosilane or long-chain organosilane. The improved mineral fillers, when incorporated into a polymer, impart a significant improvement in the physical properties of the filled polymer as compared to polymers having a mineral filler surface-modified with only one of either a short-chain or long-chain organosilane.

More specifically, an embodiment of the present invention is directed to surface-modified non-halogenated mineral filler compositions comprising a particulate mineral filler core having hydroxide groups bound to divalent or trivalent metal ions, the particulate mineral filler core having on its surface (i) one or more short-chain organosilano groups each having one to three silicon-bound short-chain hydrocarbon groups having, independently, one to three carbon atoms, and (ii) one or more long-chain organosilano groups having one to three silicon-bound straight-chained or branched, saturated or unsaturated, long-chain hydrocarbon groups containing, independently, eight to twelve carbon atoms, wherein the long-chain organosilano groups are present in an amount of up to about fifty-five mole percent of combined molar amount of long-chain and short-chain organosilano groups.

In another embodiment, the long-chain organosilano groups are present in a range governed by a minimum amount equal to or greater than about three mole percent and a maximum amount up to about fifty-five mole percent of combined molar amount of long-chain and short-chain organosilano groups. In other embodiments, the long-chain organosilano groups are present in a range governed by a minimum amount equal to or greater than about six mole percent and a maximum amount up to about fifty mole percent or forty-five mole percent or forty mole percent, of combined molar amount of long-chain organosilano groups and short-chain organosilano groups.

The present invention advantageously allows for non-halogenated mineral filler compositions, such as magnesium hydroxide, to be included in polymer compositions in flame-retarding effective amounts while mitigating or preventing the known deleterious physical effects of these mineral fillers on such polymers. These improved mineral fillers will also allow for increases in their weight percentages in such polymers without the usual worsening of physical properties.

DETAILED DESCRIPTION OF THE INVENTION

The surface-modified non-halogenated mineral filler compositions of the present invention comprise a mineral filler core having on its surface a mixture of short-chain and long-chain organosilano groups. By a synergistic effect between the short-chain and long-chain organosilano groups on the surface of the mineral filler particle, the chemical properties of the mineral filler are improved as compared to its chemical properties with only one of either a short-chain or long-chain organosilano group. In turn, the improved chemical properties of the surface-modified mineral filler impart improved physical and mechanical properties in hydrophobic polymers into which they are incorporated, as compared to the same polymers having mineral fillers surface-modified with only one type of organosilano group.

The particulate mineral filler core can be composed of any of the mineral filler compositions known in the art comprising divalent and/or trivalent metal ions formally bound to hydroxide ions. Some classes of such mineral filler compositions include, for example, the alkaline earth hydroxides, Group IIIA hydroxides, the divalent and trivalent transition metal hydroxides, their hydrates, and combinations and mixtures thereof.

Some examples of suitable alkaline earth hydroxide mineral filler core compositions include beryllium hydroxide, magnesium hydroxide, calcium hydroxide, strontium hydroxide, and barium hydroxide. A particularly suitable alkaline earth hydroxide is magnesium hydroxide. Suitable hydroxides of magnesium include, for example, natural $Mg(OH)_2$ types, such as those obtained from brucite or sea water, or natural magnesium hydroxycarbonates, such as dawsonite, huntite, or hydromagnesite. The magnesium hydroxide can also be a synthetic form, such as magnesium hydroxide marketed under the trade name MAGNIFIN® available from Martinswerk GmbH.

A particularly suitable Group IIIA hydroxide mineral filler core composition is aluminum hydroxide. Suitable hydroxides of aluminum include the natural $Al(OH)_3$-containing materials, such as, for example, hydrargillite or gibbsite, and the $AlO(OH)_x$-containing materials (where x is variable), such as boehmite. The aluminum hydroxide can also be a synthetic form, such as aluminum hydroxide marketed under the trade name MARTIFIN® or MARTINAL® available from Martinswerk GmbH.

Other suitable particulate mineral filler core compositions include, for example, calcium aluminate, gypsum dihydrate, stannous hydroxide, thallium hydroxide, and lead hydroxide.

The particulate mineral filler core can have any suitable properties, e.g., any suitable particle size distribution, surface area, density, or purity. For example, in one embodiment, the particulate mineral filler core has a particle size in the approximate range of 0.1 to 50 microns, a surface area of between about 5 and 20 $m^2/g$, a density of about 2.0 to 3.0 $g/cm^3$, and a purity of about 80 to about 99 percent by weight. In another embodiment, the particulate mineral filler core has a particle size of about 0.5 to 20 microns, a surface area of between about 5 and 20 $m^2/g$, a density of about 2.0 to 3.0 $g/cm^3$, and a purity of about 80 to about 99 percent by weight. In still another embodiment, the particulate mineral filler core has a particle size of about 0.5 to 2 microns, a surface area of between about 5 and 20 $m^2/g$, a density of about 2.0 to 3.0 $g/cm^3$, and a purity of about 80 to about 99 percent by weight.

Many such particulate mineral fillers are very hydrophilic, and may bind modest amounts of water under ambient conditions. In general, this water is undesirable in a mineral filler, and will be largely removed by heating in a drying device before the mineral is incorporated into a polymer. However, the presence of small amounts of bound water in the treated mineral filler is acceptable for purposes of this invention and may even be necessary for the formation of an effective organosilane coating.

The metal hydroxide mineral filler compositions described above can optionally be combined with one or more metal oxide compositions or other filler materials. Some metal oxide compositions include the oxides of aluminum, magnesium, calcium, titanium, silicon, and zirconium. Other filler materials include talc, calcium carbonate, and calcined or non-calcined clays.

The particulate mineral filler core described above has on its surface (i) one or more short-chain organosilano groups, and (ii) one or more long-chain organosilano groups. The surface of the particulate mineral filler core is substantially covered, typically with a network of condensed organosilane molecules bound to each other through silicon-oxygen-silicon bonds. The organosilane groups on the surface of the mineral filler can be bound (i.e., covalently by silicon-oxygen-metal bonds) to metal atoms of the mineral filler surface, or alternatively, or in combination, associated with the mineral filler surface by any suitable interaction, e.g., hydrogen bonding, ionic, and/or van der Waals interactions.

The short-chain organosilano groups each have at least one and up to three silicon-bound short-chain hydrocarbon groups. The short-chain hydrocarbon groups independently contain one to three carbon atoms, and can be straight-chained or branched, and saturated or unsaturated. Some examples of such short-chain hydrocarbon groups include methyl, ethyl, n-propyl, isopropyl, vinyl, and allyl groups.

If less than three groups bound to silicon in a short-chain organosilano group are short-chain hydrocarbon groups, the remaining groups bound to the silicon of the short-chain organosilano group can be any suitable group(s) other than a hydrocarbon group. For example, the remaining group(s) bound to silicon can be hydroxyl (—OH), amino (—$NR_2$), halo, alkoxyl (OR), or acetoxyl ($RCO_2$—) groups, wherein each occurrence of R is independently selected from the group consisting of hydrogen and a hydrocarbon group containing from one to six carbon atoms. Some examples of R groups include methyl, ethyl, n-propyl, isopropyl, n-butyl, isobutyl, sec-butyl, t-butyl, n-pentyl, neopentyl, n-hexyl, cyclopropyl, cyclobutyl, cyclopentyl, cyclohexyl, and phenyl. Alternatively, one or more of the remaining groups can be a metal atom on the surface of the mineral filler core linked to the short-chain organosilano group through a silicon-oxygen-metal bond, or another short-chain organosilano group or a long-chain organosilano group linked through a silicon-oxygen-silicon bond.

In a specific embodiment, the short-chain hydrocarbon groups are any of the short-chain hydrocarbon groups described above having one or two carbon atoms, for example, methyl, ethyl, or vinyl groups.

Some examples of short-chain organosilano groups on the surface of the particulate mineral filler include $CH_3$—Si$(OR^a)(OR^b)(OR^c)$, $CH_3CH_2$—Si$(OR^a)(OR^b)(OR^c)$, $CH_3CH_2CH_2$—Si$(OR^a)(OR^b)(OR^c)$, $CH_3CH(CH_3)$—Si$(OR^a)(OR^b)(OR^c)$, $(CH_3)_2Si(OR^a)(OR^b)$, $(CH_3CH_2)_2Si(OR^a)(OR^b)$, $(CH_3CH_2CH_2)_2Si(OR^a)(OR^b)$, $(CH_3CH(CH_3))_2Si(OR^a)(OR^b)$, $(CH_3)_3Si(OR^a)$, $(CH_3CH_2)_3Si(OR^a)$, $(CH_3CH_2CH_2)_3Si(OR^a)$, $(CH_3CH(CH_3))_3Si(OR^a)$, $(CH_3)(CH_3CH_2)Si(OR^a)(OR^b)$, $(CH_3)(CH_3CH_2CH_2)Si(OR^a)(OR^b)$, $(CH_3)(CH_3CH(CH_3))Si(OR^a)(OR^b)$, $(CH_3CH_2)(CH_3CH_2CH_2)Si(OR^a)(OR^b)$, $(CH_3CH_2)(CH_3CH(CH_3))Si(OR^a)(OR^b)$, $(CH_3)(CH_3CH_2)_2Si(OR^a)$, $(CH_3)(CH_3CH_2CH_2)_2Si(OR^a)$, $(CH_3)(CH_3CH(CH_3))_2Si(OR^a)$, $(CH_3)_2(CH_3CH_2)Si(OR^a)$, $(CH_3)_2(CH_3CH_2CH_2)Si(OR^a)$, $(CH_3)_2(CH_3CH(CH_3))Si(OR^a)$, $(CH_3CH_2)_2(CH_3CH_2CH_2)Si(OR^a)$, $(CH_3CH_2)_2(CH_3CH(CH_3))Si(OR^a)$, $CH_3$—Si$(OR^a)Cl_2$, $CH_3CH_2$—Si$(OR^a)(O_2CR)(OR^c)$, and $CH_3CH_2CH_2$—Si$(OR^a)(NR_2)(OR^c)$, wherein each occurrence of $R^a$, $R^b$, $R^c$ is independently selected from the group consisting of a divalent or trivalent metal atom on the surface of the particulate mineral filler core, a silicon atom in another organosilano group, hydrogen (H), and R, wherein R is a hydrocarbon group containing one to six carbon atoms, as described above. In a specific embodiment, at least one of $R^a$, $R^b$, and $R^c$ is a divalent or trivalent metal atom on the surface of the particulate mineral filler core or a silicon atom in another organosilano group.

The long-chain organosilano groups each have at least one and up to three silicon-bound long-chain hydrocarbon groups. The long-chain hydrocarbon groups independently contain eight to twelve carbon atoms, and can be straight-chained or branched, and saturated or unsaturated. The unsaturated long-chain hydrocarbon groups have at least one and up to six carbon-carbon double bonds.

Some examples of straight-chained, saturated long-chain hydrocarbon groups include n-octyl, n-nonyl, n-decyl, n-undecyl, and n-dodecyl groups.

Some examples of straight-chained, unsaturated long-chain hydrocarbon groups include 1-octenyl, 2-octenyl, 3-octenyl, 4-octenyl, 5-octenyl, 6-octenyl, 7-octenyl, 8-nonenyl, 9-decenyl, 10-undecenyl, 11-dodecenyl, 1,3-octadienyl, 1,4-octadienyl, 1,3,5-octatrienyl, and 1,3,5,7-octatetraenyl groups, wherein the hydrocarbon groups are numbered from the bond of the hydrocarbon group to the silicon atom in the organosilano group (the 1-yl reference bond).

Some examples of branched, saturated long-chain hydrocarbon groups include 1-methylheptyl, 2-methylheptyl, 3-methylheptyl, 4-methylheptyl, 5-methylheptyl, 6-methylheptyl, 1-ethylhexyl, 2-ethylhexyl, 3-ethylhexyl, 4-ethylhexyl, 1,1-dimethylhexyl, 2,2-dimethylhexyl, 3,3-dimethylhexyl, 4,4-dimethylhexyl, 5,5-dimethylhexyl, 1,2-dimethylhexyl, 1,3-dimethylhexyl, 1,4-dimethylhexyl, 1,5-dimethylhexyl, 1-methyloctyl, 2-methyloctyl, 3-methyloctyl, 4-methyloctyl, 5-methyloctyl, 6-methyloctyl, 7-methyloctyl, 6,6-dimethylheptyl, 1-methylnonyl, 2-methylnonyl, 3-methylnonyl, 4-methylnonyl, 5-methylnonyl, 6-methylnonyl, 7-methylnonyl, 8-methylnonyl, 7,7-dimethyloctyl, 9-methyldecyl, 8,8-dimethylnonyl, 10-methylundecyl, 9,9-dimethyldecyl, and 2,2,3,3-tetramethylbutyl groups.

Some examples of branched, unsaturated long-chain hydrocarbon groups include 1-methyl-1-heptenyl, 2-methyl-1-heptenyl, 3-methyl-1-heptenyl, 6-methyl-1-heptenyl, 1-methyl-2-heptenyl, 2-methyl-2-heptenyl, 3-methyl-2-heptenyl, 6-methyl-2-heptenyl, 5,5-dimethyl-2-hexenyl, 1,1-dimethyl-1-hexenyl, 1,2-dimethyl-1-hexenyl, 1-methyl-1,3-heptadienyl, and 1,2,3,4-tetramethyl-1,3-butadienyl groups.

If less than three groups bound to silicon in a long-chain organosilano group are long-chain hydrocarbon groups, the remaining groups bound to silicon can be any suitable group(s) other than a hydrocarbon group. For example, the remaining group(s) bound to silicon can be hydroxyl (—OH), amino (—$NR_2$), halo, alkoxyl (OR), or acetoxyl ($RCO_2$—) groups, wherein R is a hydrocarbon group as defined above. Alternatively, one or more of the remaining groups can be a metal atom on the surface of the mineral filler core linked to the short-chain organosilano group through a silicon-oxygen-metal bond, or another short-chain organosilano group or a long-chain organosilano group linked through a silicon-oxygen-silicon bond.

In more specific embodiments, the long-chain organosilano groups contain any of the long-chain hydrocarbon groups described above having eight to ten carbon atoms, or more specifically, eight carbon atoms. In a more specific embodiment, the long-chain hydrocarbon groups are straight-chained (i.e., n-octyl) or branched alkyl groups having eight carbon atoms.

Some examples of long-chain organosilano groups on the surface of the particulate mineral filler include $CH_3(CH_2)_7$—$Si(OR^a)(OR^b)(OR^c)$, $CH_3(CH_2)_8$—$Si(OR^a)(OR^b)(OR^c)$, $CH_3(CH_2)_9$—$Si(OR^a)(OR^b)(OR^c)$, $CH_3(CH_2)_{10}$—$Si(OR^a)(OR^b)(OR^c)$, $(CH_3(CH_2)_7)_2Si(OR^a)(OR^b)$, $CH_3(CH_2)_7$—$Si(OR^a)(OR^b)(Cl)$, $CH_3(CH_2)_7$—$Si(OR^a)(OR^b)(NHCH_3)$, $CH_3(CH_2)_7$—$Si(OR^a)(OR^b)(O_2CCH_3)$ and $CH_3(CH_2)_{11}$—$Si(OR^a)(OR^b)(OR^c)$, wherein each occurrence of $R^a$, $R^b$, $R^c$ is independently selected from the group consisting of a divalent or trivalent metal atom on the surface of the particulate mineral filler core, a silicon atom in another organosilano group, hydrogen (H), and R, wherein R is a hydrocarbon group containing one to six carbon atoms, as described above. In a specific embodiment, at least one of $R^a$, $R^b$, and $R^c$ is a divalent or trivalent metal atom on the surface of the particulate mineral filler core or a silicon atom in another organosilano group.

In one embodiment, the particulate mineral filler core is surface-modified by having on its surface any of the above-described short-chain organosilano groups having one or two carbon atoms in combination with any of the above-described long-chain organosilano groups having eight to twelve carbon atoms. In another embodiment, the particulate mineral filler core is surface-modified with methylsilano groups, i.e., $CH_3$—$Si(OR^a)(OR^b)(OR^c)$ wherein $R^a$, $R^b$ and $R^c$ are described above, in combination with any of the above-described long-chain organosilano groups having eight to twelve carbon atoms.

In another embodiment, the particulate mineral filler core is surface-modified by having on its surface any of the above-described short-chain organosilano groups having one to three carbon atoms in combination with any of the above-described long-chain organosilano groups having eight to ten carbon atoms. In still another embodiment, the particulate mineral filler core is surface-modified with any of the short-chain organosilano groups having one to three carbon atoms in combination with saturated, and straight or branched long-chain organosilano groups having eight carbon atoms. In yet another embodiment, the particulate mineral filler core is surface-modified with any of the short-chain organosilano groups having one to three carbon atoms in combination with long-chain n-octylsilano groups, i.e., $CH_3(CH_2)_7$—$Si(OR^a)(OR^b)(OR^c)$, wherein each occurrence of $R^a$, $R^b$ and $R^c$ is described above.

In another embodiment, the particulate mineral filler core is surface-modified by having on its surface any of the short-chain organosilano groups having one or two carbon atoms in combination with any of the long-chain organosilano groups having eight to ten carbon atoms. In still another embodiment, the particulate mineral filler core is surface-modified by having on its surface methylsilano groups in combination with any of the long-chain organosilano groups having eight to ten carbon atoms.

In yet another embodiment, the particulate mineral filler core is surface-modified by having on its surface any of the short-chain organosilano groups having one or two carbon atoms in combination with any of the long-chain organosilano groups having eight carbon atoms. In another embodiment, the particulate mineral filler core is surface-modified by having on its surface methylsilano groups in combination with any of the long-chain organosilano groups having eight carbon atoms. In still another embodiment, the particulate mineral filler core is surface-modified by having on its surface methylsilano groups in combination with n-octylsilano groups.

In one embodiment of the present invention, the long-chain organosilano groups on the surface of the particulate mineral core are preferably present in a maximum amount of up to about fifty-five mole percent of the combined molar amount of long-chain organosilano groups and short-chain organosilano groups, which corresponds to a maximum molar ratio of long-chain to short-chain organosilano groups of about 1.2:1. Accordingly, the short-chain organosilano groups are preferably present in a minimum amount of at least about forty-five mole percent.

For example, in one specific embodiment, the long-chain organosilano groups on the surface of the particulate mineral core are present in a maximum amount of up to about forty mole percent (corresponding to a maximum molar ratio of long-chain to short-chain organosilano groups of about 0.65:1 or 1:1.5). In other embodiments, the long-chain organosilano groups on the surface of the particulate mineral core are present in a range governed by a minimum amount equal to or greater than about three mole percent or six mole percent, and up to a maximum amount of about fifty-five percent or fifty mole percent or forty-five mole percent or forty mole percent, of the combined molar amount of long-chain and short-chain organosilano groups.

In a specific embodiment, a particulate mineral filler has on its surface a mixture of organosilano groups of formulas n-octyl-$Si(OR^a)(OR^b)(OR^c)$ and methyl-$Si(OR^a)(OR^b)(OR^c)$, wherein the n-octyl-$Si(OR^a)(OR^b)(OR^c)$ groups are present in an amount of about forty mole percent and the methyl-Si(OR$^a$)(OR$^b$)(OR$^c$) groups are present in an amount of about sixty mole percent, where R$^a$, R$^b$, and R$^c$ have been defined above.

The surface-modified mineral filler described above can further include a modified or unmodified polydimethylsiloxane-containing polymer or copolymer. More particularly, the polydimethylsiloxane-containing polymer can be a polymer belonging to the class of vinyl-modified polydimethylsiloxanes, and more particularly, vinyl-terminated polysiloxanes, such as those according to the formula CH$_2$=CH—(Si(CH$_3$)$_2$O)$_n$—Si(CH$_3$)$_2$—CH=CH$_2$ where n is any suitable integer or average number, preferably greater than 5 and up to any suitable upper number including, e.g., 10, 50, 100, 500, or greater. The polydimethylsiloxane-containing polymer can be included in any suitable weight percentage of the total weight of mineral filler, and more particularly, for example, a weight percent of 5 to 25%, or 10 to 20%, of the combined weight of the particulate mineral filler core, organosilano groups and polydimethylsiloxane-containing polymer.

The surface-modified non-halogenated mineral filler compositions of the invention can be synthesized according to any of the methods known in the art. For example, the mineral filler compositions can be produced by a process comprising reacting a particulate mineral filler core described above with: (i) one or more short-chain organosilanes within the formula R$^1_m$R$^2_n$R$^3_p$Si(X)$_{4-m-n-p}$ wherein R$^1$, R$^2$, and R$^3$ independently represent any of the short-chain hydrocarbon groups described above having one to three carbon atoms; m, n, and p is each 0 or 1, with the proviso that at least one of m, n, and p is 1; the group X represents any group capable of reacting with surface hydroxyl groups to form a surface-oxysilane bond, and include, but are not limited to, a halo group, an amino group (—NR$_2$), a hydroxyl group (OH), an alkoxide group (—OR), or an acetoxyl group (RCO$_2$—) wherein R is hydrogen or a hydrocarbon group having one to six carbon atoms, as described above, and (ii) one or more long-chain organosilanes of the formula R$^4_m$R$^5_n$R$^6_p$Si(X)$_{4-m-n-p}$ wherein R$^4$, R$^5$, and R$^6$ independently represent any of the long-chain hydrocarbon groups described above having eight to twelve carbon atoms, and m, n, p, and X are as defined above, and wherein the long-chain and short-chain organosilane compounds are used in such relative amounts that the resulting long-chain organosilano groups on the surface of the mineral filler are in an amount of up to about fifty-five mole percent of the combined molar amount of long-chain and short-chain organosilano groups. In other embodiments, the long-chain and short-chain organosilane compounds are used in such relative amounts that the resulting long-chain organosilano groups on the surface of the mineral filler are in an amount of up to about fifty mole percent, or forty-five mole percent, or forty mole percent of the combined molar amount of long-chain and short-chain organosilano groups.

In other embodiments, the long-chain and short-chain organosilane compounds are used in such relative amounts that the molar percentage of long-chain organosilano groups on the surface of the mineral filler is equal to or greater than about three mole percent or six mole percent, and up to about fifty-five mole percent or fifty mole percent or forty-five mole percent or forty mole percent, of the combined molar amount of long-chain and short-chain organosilano groups.

In a more specific embodiment, the particulate mineral filler compositions are produced by a process comprising reacting a particulate mineral filler core described above with: (i) one or more short-chain organosilanes within the formula R$^1$Si(OR)$_3$, wherein R$^1$ and OR are as described above, and (ii) one or more long-chain organosilanes of the formula R$^4$Si(OR)$_3$, wherein R$^4$ and OR are as described above, wherein the long-chain organosilane compound(s) are in an amount of up to about fifty-five mole percent of the combined molar amount of short-chain and long-chain organosilane compounds.

Some examples of short-chain organosilane compounds suitable for reacting with the mineral filler core include methyltrimethoxysilane, methyltriethoxysilane, dimethyldiethoxysilane, methyltriethoxysilane, methyltri-n-propoxysilane, methyltriisopropoxysilane, methyltributoxysilane, methyltriphenoxysilane, ethyltrimethoxysilane, ethyltriethoxysilane, ethyltri-n-propoxysilane, ethyltriisopropoxysilane, vinyltrimethoxysilane, vinyltriethoxysilane, allyltrimethoxysilane, allyltriethoxysilane, n-propyltrimethoxysilane, n-propyltriethoxysilane, n-propyltriphenoxysilane, isopropyltrimethoxysilane, and isopropyltriethoxysilane.

Some examples of long-chain organosilane compounds suitable for reacting with the mineral filler core include n-octyltrimethoxysilane, n-octyltriethoxysilane, bis-(n-octyl)diethoxysilane, tris-(n-octyl)ethoxysilane, n-octyltri-n-propoxysilane, n-octyltriisopropoxysilane, n-octyltributoxysilane, n-octyltriphenoxysilane, 6-methylheptyltriethoxysilane, 7-heptenyltriethoxysilane, n-nonyltrimethoxysilane, n-nonyltriethoxysilane, n-decyltriethoxysilane, n-undecyltriethoxysilane, and n-dodecyltriethoxysilane.

In reacting the organosilane compounds with the mineral filler, the organosilane compounds can be in any suitable weight percentage. In a specific embodiment, a mixture of methyltriethoxysilane and n-octyltriethyoxysilane is included in an amount of at least about 0.5 and up to about 3.0 percent by weight, or about 1.0 to about 2.5 percent by weight, or about 1.5 percent by weight, of the combined weight of the particulate mineral filler core and organosilane compounds. To achieve the same surface coverage with other organosilanes described above, these amounts would naturally need to be adjusted upward if silanes of higher molecular weight are used, or downward for organosilanes of lower molecular weight. Similarly, when using a mineral filler with lower specific surface area, the amount of organosilane used would naturally need to be adjusted downward.

The organosilane compounds described above can be made to react with the mineral filler surface by any suitable reaction process, and more typically, via a hydrolytic reaction with hydroxyl groups and/or adsorbed water residing on the surface of the mineral filler. A catalyst such as an inorganic or organic acid, or transition metal catalysts, including but not limited to tin compounds, titanium compounds and bismuth compounds can optionally be used to facilitate the reaction, but is not preferred. For example, the organosilane compounds and particulate mineral filler can be reacted by being combined and mixed for a suitable amount of time at room temperature or elevated or depressed temperatures.

In another embodiment, the particulate mineral filler is combined with the mixture of organosilane compounds under high-speed mixing conditions, e.g., at 2000 to 3000 revolutions per minute (rpm) in a mixer, such as a Henschel mixer. Such high-speed mixing prevents the ready agglomeration of the particles and allows for more complete surface modification by the organosilanes.

After mixing the organosilane compounds with the mineral filler, the reacted mixture can be subjected to a residency period to ensure more complete reaction of the organosilanes with each other and/or with the mineral filler surface. For example, the reacted mixture can be subjected to circulating air at ambient temperature (e.g., 20° C.-30° C.) for at least 4-5 hours, or alternatively, to circulating air at approximately 100° C. for 1-2 hours.

One or more volatile solvents, such as acetone or an ether, can be optionally included in the reaction between organosilanes and mineral filler. However, use of such solvents is not preferred since their use typically requires a subsequent removal step. The use of water and/or an aqueous catalyst, such as an acid, during the reaction is also optional, but not preferred since their use would require more drying of the treated mineral.

Examples have been set forth below for the purpose of illustration. The scope of the invention is not to be in any way limited by the examples set forth herein.

Examples 1-7

Four-pound (4 lb. or 1.8 kilogram) batches of magnesium hydroxide as MAGNIFIN® were either not mixed with any silane compound (control C-1), mixed with only methyltriethoxysilane (control C-2) or n-octyltriethoxysilane (control C-3), or mixed with varying weight percentages of a 1:1 (50:50) weight ratio of n-octyltriethoxysilane to methyltriethoxysilane (formulations 4-7), in a Henschel high intensity mixer at about 2000 rpm for approximately two minutes. For each batch, except the control C-1, the MAGNIFIN® was mixed with the organosilane compound(s) by forming layers of the MAGNIFIN® (preferably four layers) in the mixer and syringing the organosilane compound(s) on each layer before mixing. A summary of the formulations used is provided in Table 1 below.

Twenty grams of each of the mineral filler compositions in Table 1 were taken directly from the mixer without being subjected to a residency period, and each amount was placed in a jar containing water and shaken for approximately thirty seconds. The bulk of each mineral filler settled to the bottom of the jars.

Example 8-12

Using the same method described above, four-pound (1.8 kg) batches of magnesium hydroxide as MAGNIFIN® were mixed with 27 grams (1.5 weight percent) of mixtures of n-octyltriethoxysilane and methyltriethoxysilane varying in mole percentage of n-octyltriethoxysilane (other than about 40 mole percent as already shown in Examples 4-7) of approximately 6.7 mole percent, 21.7 mole percent, 60.1 mole percent, and 85.3 mole percent, which correspond to weight percentage ratios of n-octyltriethoxysilane to methyltriethoxysilane of 10:90, 30:70, 70:30, and 90:10, for

TABLE 1

Surface-Modified Mineral Filler Formulations

|  | C-1 | C-2 | C-3 | 4 | 5 | 6 | 7 |
|---|---|---|---|---|---|---|---|
| Magnesium Hydroxide as MAGNIFIN ®[1] | 100 | 98.5 | 98.5 | 99.0 | 98.5 | 98.0 | 97.5 |
| Percentage of n-octyltriethoxysilane by weight of the total weight of n-octyltriethoxysilane and methyltriethoxysilane (weight ratio of octyltriethoxysilane to methyltriethoxysilane) | 0 | 0 | 100 | 50 (50:50) | 50 (50:50) | 50 (50:50) | 50 (50:50) |
| Corresponding mole percent n-octyltriethoxysilane[2] | 0 | 0 | 100 | 39-40 | 39-40 | 39-40 | 39-40 |
| Corresponding mole percent methyltriethoxysilane[3] | 0 | 100 | 0 | 60-61 | 60-61 | 60-61 | 60-61 |
| Weight Percentage Incorporation of the Organosilane(s) in MAGNIFIN ® Mineral Filler | 0 | 1.5 | 1.5 | 1.0 | 1.5 | 2.0 | 2.5 |

[1]Martinswerck product, powder, density = 2.39 g/cm³, bulk density = 300-400 kg/m³, particle size = 95-1.15 μm
[2]Molecular weight of n-octyltriethoxysilane is 276.48 g/mol
[3]Molecular weight of methyltriethoxysilane is 178.3 g/mol examples 8-11, respectively. A summary of the formulations used is provided in Table 2 below.

TABLE 2

Surface-Modified Mineral Filler Formulations

|  | 8 | 9 | 10 | 11 | 12 |
|---|---|---|---|---|---|
| Magnesium Hydroxide as MAGNIFIN ®[1] | 98.5 | 98.5 | 98.5 | 98.5 | 98.5 |
| Percentage of n-octyltriethoxysilane by weight of the total weight of n-octyltriethoxysilane and methyltriethoxysilane (weight ratio of octyltriethoxysilane to methyltriethoxysilane) | 10 (10:90) | 30 (30:70) | 70 (70:30) | 90 (90:10) | 50 (43:43) |
| Corresponding mole percent n-octyltriethoxysilane[2] | 6.7 | 21.7 | 60.1 | 85.3 | 39-40 |
| Corresponding mole percent methyltriethoxysilane[3] | 93.3 | 78.3 | 39.9 | 14.7 | 60-61 |
| Vinyl-Modified Polydimethylsiloxane | 0 | 0 | 0 | 0 | 14 |
| Weight Percentage Incorporation of the Organosilane(s) in MAGNIFIN ® Mineral Filler | 1.5 | 1.5 | 1.5 | 1.5 | 1.5 |

[1]Martinswerck product, powder, density = 2.39 g/cm³, bulk density = 300-400 kg/m³, particle size = .95-1.15 μm
[2]Molecular weight of n-octyltriethoxysilane is 276.48 g/mol
[3]Molecular weight of methyltriethoxysilane is 178.3 g/mol In a separate experiment, similar portions of the same mineral filler compositions in Tables 1 and 2 were taken directly from the mixer and were subjected to a residency period by being placed in an oven at ambient temperature with circulating air for 48 hours. Small amounts of each of the mineral filler compositions (e.g., 1-2 grams), now completely reacted during the residency period, were placed in jars with water and shaken. The mineral filler in the jar holding C-1 completely settled to the bottom, while the mineral filler in jars holding C-2 and C-3 showed nearly equal portions that floated and settled to the bottom.

Surprisingly, magnesium hydroxide mineral filler treated with a mixture of organosilanes having the long-chain (n-octyl) organosilane in a weight percentage to total weight of organosilanes of less than seventy percent (i.e., less than sixty mole percent), as in formulations 4-7 in Table 1 and formulations 8, 9, and 12 in Table 2, predominantly floated, along with, at most, a minor amount of settling. Any settling component for formulations 4-9 or 12 was significantly less than for controls C-2 and C-3.

Even more unexpectedly, formulations 10 and 11, which contained the long-chain (n-octyl) organosilane in a weight percentage to total weight of organosilanes of or greater than seventy percent (i.e., of or greater than sixty mole percent) settled more than formulations 4-9 or 12. The settling portions of formulations 10 and 11 were significantly greater than the settling portions of formulations 4-9 and 12.

The results of Examples 1-12 firstly demonstrate that all of the silane-treated mineral fillers, including C-2 and C-3, are more hydrophobic than mineral filler not treated with any organosilane compounds. But more significantly and unexpectedly, the results of Examples 1 to 12 above provide evidence that treated mineral fillers reacted with a combination of organosilane compounds with the long-chain hydrocarbon group (e.g., n-octyl) in an amount less than about sixty mole percent (i.e., formulations 4-9 and 12) are significantly more hydrophobic than mineral fillers reacted with only one type of organosilane (i.e., controls C-2 and C-3), and significantly more hydrophobic than formulations containing the long-chain hydrocarbon group (e.g., n-octyl) in an amount of or greater than about sixty mole percent (i.e., formulations C-3, 10, and 11).

Without being bound by any theory, it is believed that reacting the particulate mineral filler with only one type of organosilane compound leaves portions of the mineral filler surface unreacted, and hence, hydrophilic. In contrast, it is believed that by using a combination of organosilane compounds as described above, a more favorable packing or distribution of organosilane groups occurs on the mineral filler surface. This more favorable packing or distribution is believed to reduce or even prevent the formation of unreacted hydrophilic portions on the mineral filler surface.

As discussed above, the physical problems caused by mineral fillers in hydrophobic polymers are due predominantly to the poor compatibility, and hence, poor physical interaction, between the hydrophilic mineral filler particles and the hydrophobic polymer. Accordingly, by rendering the mineral filler more hydrophobic than the prior art, as accomplished by the present invention, flame-retardant polymers incorporating the surface-modified mineral fillers of the invention have improved physical properties as compared to such flame-retardant polymers using mineral fillers of the prior art.

As also discussed above, mineral fillers such as magnesium hydroxide have heretofore suffered from being significantly hygroscopic even when coated with hydrophobic surface modifiers known in the art. This ability to absorb (or adsorb) water during storage and processing creates a water-absorbed mineral filler whose incorporation into a polymer causes a host of detrimental effects in the physical properties of the polymer. Therefore, the more highly hydrophobized mineral fillers of the present invention provide the additional benefit, by virtue of their heightened resistance to the absorption of water during storage and processing, of being easier to keep dry and capable of imparting better physical properties to polymers in which they are incorporated.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A process for producing a mineral filler composition having short-chain and long-chain organosilano groups on its surface comprising:
   (a) combining:
      (i) a particulate mineral filler;
      (ii) one or more short-chain organosilanes having the general formula:

$R^1Si(OR)_3$, wherein $R^1$ is an unsubstituted alkyl group containing one to three carbon atoms; and each occurrence of R is independently selected from the group consisting of hydrogen and a hydrocarbon group containing one to six carbon atoms; and
      (iii) one or more long-chain organosilanes having the general formula:

$R^4Si(OR)_3$, wherein $R^4$ is an unsubstituted alkyl group containing eight to twelve carbon atoms; and each occurrence of R is independently selected from the group consisting of hydrogen and a hydrocarbon group containing one to six carbon atoms; and
   wherein the long-chain organosilanes are in an amount of from about three mole percent to about fifty five mole percent of the combined molar amount of long-chain and short-chain organosilane compounds; and
   (b) mixing the combined filler, short-chain organosilanes and long-chain organosilanes to react the filler, the short-chain organosilanes and the long-chain organosilanes, thereby producing the mineral filler composition having short-chain and long-chain organosilano groups on its surface.

2. The process of claim 1, wherein the mixing step comprises mixing the combined filler, short-chain organosilanes and long-chain organosilanes in a mixer under high-speed mixing conditions.

3. The process of claim 1, wherein the mixing step is followed by subjecting the mixed filler, short-chain organosilanes and long-chain organosilanes to a residency period at ambient temperature.

4. The process of claim 1, wherein the mixing step is followed by subjecting the mixed filler, short-chain organosilanes and long-chain organosilanes to circulating air at about 100° C. for a period of 1-2 hours.

5. The process of claim 1 wherein the short-chain organosilane is selected from the group consisting of methyltrimethoxysilane, methyltriethoxysilane, methyltri-n-propoxysilane, methyltriisopropoxysilane, methyltributoxysilane, methyltriphenoxysilane, ethyltrimethoxysilane, ethyltriethoxysilane, ethyltri-n-propoxysilane, vinyltrimethoxysilane, vinyltriethoxysilane, allyltrimethoxysilane, allyltiethoxysilane, n-propyltrimethoxysilane, n-propyltriethoxysilane, n-propyltriphenoxysilane, isopropyltrimethoxysilane, and isopropyltriethoxysilane.

6. The process of claim 5 wherein the short-chain organosilane is selected from the group consisting of methyltrimethoxysilane, methyltriethoxysilane, ethyltrimethoxysilane, ethyltriethoxysilane, n-propyltrimethoxysilane, and n-propyltriethoxysilane.

7. The process of claim 1 wherein the long-chain organosilane is selected from the group consisting of n-octyltrimethoxysilane, n-octyltriethoxysilane, n-octyltri-n-propoxysilane, n-octyltriisopropoxysilane, n-octyltributoxysilane, n-octyltriphenoxysilane, 6-methylheptyltriethoxysilane, 7-heptenyltriethoxysilane, n-nonyltrimethoxysilane, n-nonyltriethoxysilane, n-decyltriethoxysilane, n-undecyltriethoxysilane, and n-dodecyltriethoxysilane.

8. The process of claim 7 wherein the long-chain organosilane is selected from the group consisting of n-octyltrimethoxysilane, n-octyltriethoxysilane, n-nonyltrimethoxysilane, n-nonyltriethoxysilane, n-decyltriethoxysilane, n-undecyltriethoxysilane, and n-dodecyltriethoxysilane.

9. The process of claim 1 wherein the short-chain organosilane comprises methyltriethoxysilane and the long-chain organosilane comprises n-octyltriethoxysilane.

10. The process of claim 9 wherein the amount of the methyltriethoxysilane and n-octyltriethoxysilane is from 0.5 to 3.0 percent by weight based upon the combined weight of the particulate mineral filler and the organosilanes.

11. The process of claim 1 wherein the particulate mineral filler is a divalent or trivalent metal ion formally bound to a hydroxide ion.

12. The process of claim 11 wherein the particulate mineral filler is selected from the group consisting of alkaline earth hydroxides, Group IIIA hydroxides, divalent transition metal hydroxides, hydrates of divalent transition metal hydroxides, trivalent transition metal hydroxides, hydrates of trivalent transition metal hydroxides, and mixtures thereof.

13. The process of claim 12 wherein the particulate mineral filler is selected from the group consisting of beryllium hydroxide, magnesium hydroxide, calcium hydroxide, strontium hydroxide, barium hydroxide, magnesium hydroxycarbonates, aluminum hydroxide, calcium aluminate, gypsum dehydrate, stannous hydroxide, thallium hydroxide, and lead hydroxide.

14. The process of claim 12 wherein the particulate mineral filler is selected from the group consisting of brucite, dawsonite, huntite, hydromagnesite, synthetic magnesium hydroxide, hydrargillite, gibbsite, bochmite, and synthetic aluminum hydroxide.

15. The process of claim 12 wherein the particulate mineral filler core has a particle size of from 0.1 to 50 microns.

16. The process of claim 1 wherein the particulate mineral filler further comprises one or more metal oxide compositions selected from the group consisting of aluminum oxide, magnesium oxide, calcium oxide, titanium oxide, silicon oxide, and zirconium oxide.

17. The process of claim 1, wherein the long-chain organosilanes are in an amount of from about six mole percent to about forty mole percent of the combined molar amount of long-chain and short-chain organosilane compounds.

18. A process for producing a mineral filler composition having short-chain and long-chain organosilano groups on its surface comprising:
(a) combining:
(i) a particulate mineral filler;
(ii) one or more short-chain organosilanes having the general formula:

$R^1{}_m R^2{}_n R^3{}_p Si(X)_{4-m-n-p}$, wherein $R^1$, $R^2$, and $R^3$ are independently unsubstituted alkyl groups containing one to three carbon atoms; m, n, and p is each 0 or 1, with the proviso that at least one of m, n, and p is 1; and X is selected from the group consisting of alkoxyl and hydroxyl; and
(iii) one or more long-chain organosilanes having the general formula:

$R^4{}_m R^5{}_n R^6{}_p Si(X)_{4-m-n-p}$, wherein $R^4$, $R^5$, and $R^6$ are independently unsubstituted alkyl groups containing eight to twelve carbon atoms; m, n, and p is each 0 or 1, with the proviso that at least one of m, n, and p is 1; and X is selected from the group consisting of alkoxyl and hydroxyl; and
wherein the long-chain organosilanes are in an amount of from about three mole percent to about fifty five mole percent of the combined molar amount of long-chain and short-chain organosilane compounds; and
(b) mixing the combined filler, short-chain organosilanes and long-chain organosilanes to react the filler, the short-chain organosilanes and the long-chain organosilanes, thereby producing the mineral filler composition having short-chain and long-chain organosilano groups on its surface.

19. The process of claim 18, wherein the long-chain organosilanes are in an amount of from about six mole percent to about forty mole percent of the combined molar amount of long-chain and short-chain organosilane compounds.

20. The process of claim 18, wherein $R^1$, $R^2$, and $R^3$ are independently hydrocarbon groups containing one to two carbon atoms; and $R^4$, $R^5$, and $R^6$ are independently hydrocarbon groups containing eight to ten carbon atoms.

21. A process for producing a polymer composition including a mineral filler composition, the mineral filler composition having short-chain and long-chain organosilano groups on its surface comprising:
(a) combining:
(i) a particulate mineral filler;
(ii) one or more short-chain organosilanes having the general formula:

$R^1 Si(OR)_3$, wherein $R^1$ is an unsubstituted alkyl group containing one to three carbon atoms; and each occurrence of R is independently selected from the group consisting of hydrogen and a hydrocarbon group containing one to six carbon atoms; and
(iii) one or more long-chain organosilanes having the general formula:

$R^4 Si(OR)_3$, wherein $R^4$ is an unsubstituted alkyl group containing eight to twelve carbon atoms; and each occurrence of R is independently selected from the group consisting of hydrogen and a hydrocarbon group containing one to six carbon atoms; and
wherein the long-chain organosilanes are in an amount of from about three mole percent to about fifty five mole percent of the combined molar amount of long-chain and short-chain organosilane compounds; and
(b) mixing the combined filler, short-chain organosilanes and long-chain organosilanes to react the filler, the short-chain organosilanes and the long-chain organosilanes, thereby producing the mineral filler composition having short-chain and long-chain organosilano groups on its surface; and
(c) incorporating the mineral filler composition into an olefin-based polymer, thereby producing the polymer composition.

22. The process of claim 21, wherein the olefin-based polymer is polyethylene.

23. The process of claim 21, wherein the olefin-based polymer is polypropylene.

24. The process of claim 21, wherein the mineral filler composition is incorporated into the olefin-based polymer in a flame-retarding amount.

25. The process of claim 21, wherein the short-chained organosilane is methyltriethoxysilane and the long-chained organosilane is octyltriethoxysilane.

26. A process for producing a polymer composition including a mineral filler composition, the mineral filler composition having short-chain and long-chain organosilano groups on its surface comprising:

(a) combining:
  (i) a particulate mineral filler;
  (ii) one or more short-chain organosilanes having the general formula:

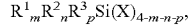

wherein $R^1$, $R^2$, and $R^3$ are independently unsubstituted alkyl groups containing one to three carbon atoms; m, n, and p is each 0 or 1, with the proviso that at least one of m, n, and p is 1; and X is selected from the group consisting of alkoxyl and hydroxyl; and
  (iii) one or more long-chain organosilanes having the general formula:

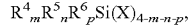

wherein $R^4$, $R^5$, and $R^6$ are independently unsubstituted alkyl groups containing eight to twelve carbon atoms; m, n, and p is each 0 or 1, with the proviso that at least one of m, n, and p is 1; and X is selected from the group consisting of alkoxyl and hydroxyl; and wherein the long-chain organosilanes are in an amount of from about three mole percent to about fifty five mole percent of the combined molar amount of long-chain and short-chain organosilane compounds; and (b) mixing the combined filler, short-chain organosilanes and long-chain organosilanes to react the filler, the short-chain organosilanes and the long-chain organosilanes, thereby producing the mineral filler composition having short-chain and long-chain organosilano groups on its surface; and (c) incorporating the mineral filler composition into an olefin-based polymer, thereby producing the polymer composition.

27. The process of claim 26, wherein the olefin-based polymer is polyethylene.

28. The process of claim 26, wherein the olefin-based polymer is polypropylene.

29. The process of claim 26, wherein the mineral filler composition is incorporated into the olefin-based polymer in a flame-retarding amount.

* * * * *